United States Patent [19]

Shirk

[11] Patent Number: 4,907,537

[45] Date of Patent: Mar. 13, 1990

[54] CAT TOY

[76] Inventor: Charles A. Shirk, 2208 Kornegay Dr., Raleigh, N.C. 27603

[21] Appl. No.: 208,971

[22] Filed: Jun. 20, 1988

[51] Int. Cl.[4] ............................................. A01K 15/02
[52] U.S. Cl. ...................................... 119/29; 446/325; 446/364; 446/396
[58] Field of Search .................... 119/29, 29.5; 446/93, 446/95, 96, 278, 323, 325, 364, 396

[56] References Cited

U.S. PATENT DOCUMENTS

| D. 159,744 | 8/1950 | Low | 119/29.5 |
|---|---|---|---|
| 1,687,610 | 10/1928 | Griffin | 446/364 |
| 2,168,425 | 8/1939 | Sleeseman | 446/364 |
| 2,632,977 | 3/1953 | Valasek | 446/325 |
| 3,727,583 | 4/1973 | Muraro | 119/29 |
| 3,805,444 | 4/1974 | Adickes | 446/325 X |
| 4,712,510 | 12/1987 | Tae-Ho | 119/29 |
| 4,770,123 | 9/1988 | Bell | 119/29 |

FOREIGN PATENT DOCUMENTS

| 1140812 | 2/1985 | U.S.S.R. | 446/325 |
|---|---|---|---|
| 1279647 | 12/1986 | U.S.S.R. | 446/325 |

Primary Examiner—Robert P. Swiatek
Assistant Examiner—Todd E. Manahan

[57] ABSTRACT

A cat toy with an ovate-shaped configuration having a weight inserted into a recessed area in the front section and a tail piece protruding from the rear section. When manipulated by a cord attached in a front to rear through configuration, the toy moves and rolls in unpredictable ways creating an enticing toy cats will chase.

1 Claim, 1 Drawing Sheet

CAT TOY

FIELD OF THE INVENTION

The invention relates to a toy for the amusement and exercising of cats. The toy is attached to a cord at the front end and is designed to move with erratic motions created by an ovate-shaped body having a weight recessed in the front end of body and a cord tail at the rear of the body.

BACKGROUND OF INVENTION

The toy is designed to create inter-play between a person and a cat. It is amusing, safe, and durable, with no loose elements for the cat to swallow. The assembly firmly interlocks all elements together. The extreme erratic motion is unique in cat toys.

SUMMARY OF INVENTION

This invention relates to a toy for amusing and exercising cats when moved by an attached cord. The toy has three elements that cause the unique action: the ovate-shape of the body causes erratic motion from side to side; a weight recessed into the front end of the body causes the back end of the toy to elevate slightly where a tail piece is inserted. When the toy is manipulated by an attached cord, the tail piece, being slightly elevated by a weight recessed in the front of the toy, will vibrate from side to side and up and down. All pieces of the toy, when assembled, are interlocked on to the body creating a safe cat toy. The primary objective of the invention is to provide a toy for amusing cats. A further object of the invention is to provide a toy which moves in an erratic manner.

DESCRIPTION OF PREFERRED EMBODIMENT

Figure 1:
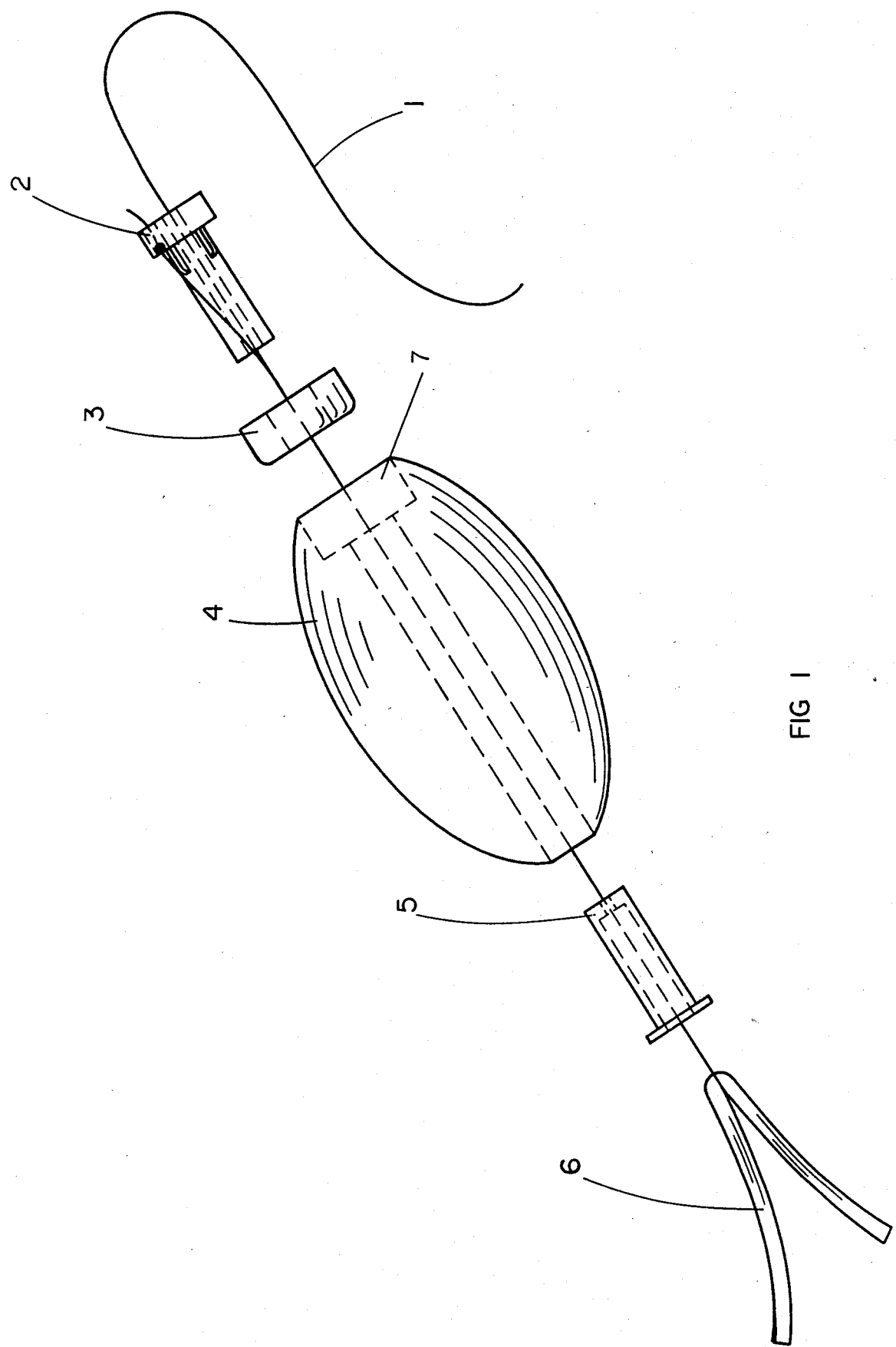
FIG. 1 is a prospective view of the toy with components disassembled; (1) cord attachment; (2) front interlocking plug; (3) weight; (4) body element; (5) rear interlocking plug; (6) tail piece; and (7) recessed slot in body element where weight (3) is inserted.

FIG. 1 is a prospective view of the toy with the elements separated for demonstration. The body element (4) is oblong and ovate in shape with a bore completely through the center of the element. At the front end of body element (4) there is a recessed area (7) into which is inserted a weight (3) to counterbalance the tail piece (6). Tail piece (6) consists of an elongated strip member folded in half along its longitudinal axis. A cord attachment (1) enters through the rear plug (5) and enages said folded tail piece (6) in a looping fashion. Said cord is then threaded back through rear plug (5), body element (4), weight (3) and front plug (2) seating weight into recessed area. Cord emerges through a small hole in front plug (2) where a knot is tied. Cord attached in this manner engages both front and rear of said plugs in an opposing fashion, interlocking weight and tail piece onto said ovate body. Cord may be affixed to a rod to facilitate the erratic movement.

What is claimed is:
1. A toy for amusing cats, comprising:
   (a) an ovate shaped body with a center bore along the longitudinal axis thereof and further having a recessed area at one end centered around said bore;
   (b) a weight positioned in said recessed area, said weight having a cylindrical hole therein;
   (c) a front plug inserted in said hole of said weight, said front plug having a center hole therein;
   (d) a rear plug inserted in the other end of said bore, said rear plug having a center hole therein;
   (e) a tail means comprising an elongated strip member folded in half along its transverse axis;
   (f) a string attachment means entering through said hole of said front plug and passing along said bore and through said hole of said rear plug and engaging said folded strip member in a looping fasion, said string member engaging said front and rear plugs in an opposing fashion such that said tail means and said weight are interconnected onto said ovate body.

* * * * *